United States Patent [19]

Steffes

[11] Patent Number: 4,977,641

[45] Date of Patent: Dec. 18, 1990

[54] LEVER HANDLE ASSEMBLY FOR SANITARY FIXTURES

[75] Inventor: Rudolf Steffes, Mueckeln, Fed. Rep. of Germany

[73] Assignee: American Standard Inc., New York, N.Y.

[21] Appl. No.: 524,715

[22] Filed: May 17, 1990

Related U.S. Application Data

[63] Continuation of Ser. No. 246,365, Sep. 19, 1988, abandoned.

[30] Foreign Application Priority Data

Sep. 24, 1987 [AT] Austria ............................... 2427/87

[51] Int. Cl.[5] ...................... F16K 5/00; F16K 31/00
[52] U.S. Cl. .................................... 16/121; 251/80; 251/81
[58] Field of Search .............. 16/121, 118, DIG. 30; 251/81, 80

[56] References Cited

U.S. PATENT DOCUMENTS

3,441,115 4/1969 Gunther ............................. 251/81
3,827,670 8/1974 Saarem ............................. 251/81

FOREIGN PATENT DOCUMENTS

1162263 9/1958 France .............................. 251/81
569219 11/1975 Switzerland .................... 251/81

Primary Examiner—Kurt Rowan
Assistant Examiner—Carmine Cuda
Attorney, Agent, or Firm—Blum Kaplan

[57] ABSTRACT

A lever handle assembly for a sanitary water fixture which includes a spindle for actuating the fixture. The lever handle assembly comprises the handle adapter, a handle sleeve having a handle lever, and a friction coupling. The handle adapter nonrotatably connects over the spindle, and the friction coupling couples the handle adapter to the handle sleeve, whereby the spindle can be selectively opened or closed by actuating the handle lever.

3 Claims, 1 Drawing Sheet

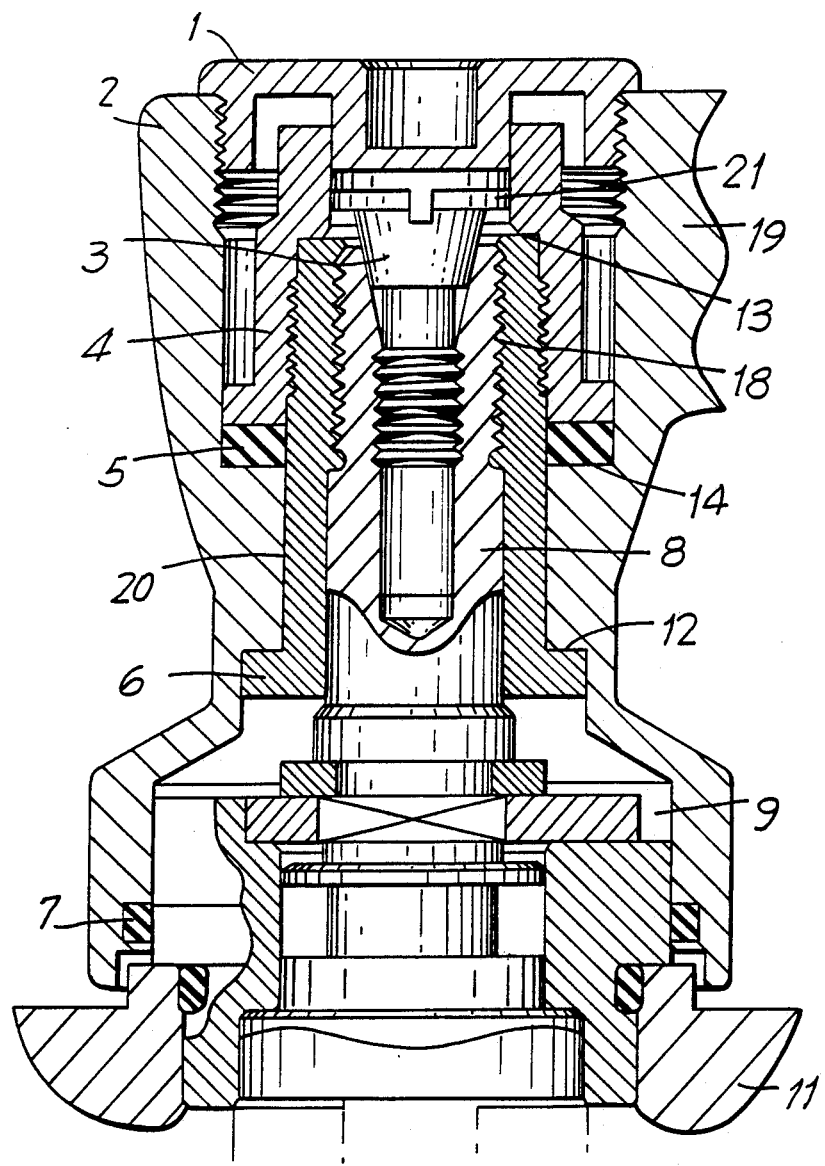

LEVER HANDLE ASSEMBLY FOR SANITARY FIXTURES

This is a continuation of application Ser. No. 07/246,365, filed on Sept. 19, 1988, now abandoned.

FIELD OF INVENTION

The present invention relates to a lever handle assembly for sanitary water fixtures, wherein the lever handle is integral with a sleeve which is connected to a spindle for actuating the water fixture by way of a handle adapter.

BACKGROUND OF INVENTION

For many applications, sanitary water fixtures having single-lever mixer valves are desired in which the length of the lever arm is very long, for example as in hospitals, where before surgery, the long handles can be actuated with the elbow. However, such long lever arms involve problems especially regarding the hazard of spindle failure and the possibility of accidental opening when wall-mounted.

Thus, a primary object of the present invention is to provide a long lever handle which can be installed on top of cartridges whose spindles have a small ultimate twisting and bending moment and where there is a brake to prevent accidental opening when wall-mounted.

SUMMARY OF INVENTION

According to the present invention, a lever handle assembly for a sanitary water fixture is provided, wherein the fixture includes a spindle for actuating the fixture. The lever handle assembly comprises a handle adapter, a handle sleeve, and a friction coupling. The handle adapter is for nonrotatable connection over the spindle, and the handle sleeve has a handle lever. The frictional coupling couples the handle adapter to the handle sleeve, whereby the spindle can be selectively opened or closed by actuating the handle lever.

In the preferred embodiment, the friction coupling includes a clutch sleeve and an elastic ring. The handle sleeve has an annular flange with an upper shoulder on which the elastic ring rests, and the clutch sleeve is adjustably connected to the handle adapter so as to press the elastic ring against the upper shoulder. In addition, the annular flange of the handle sleeve further includes a bottom shoulder, and the handle adapter further includes an annular flange. The bottom shoulder and the annular flange are pressed against each other when the clutch sleeve is connected to the handle adapter, so as to create a frictional interface therebetween.

According to the present invention, it is proposed that a frictional clutch can be provided between the handle sleeve and the handle adapter, and by using this measure the aboveaddressed problems may be solved in the satisfactory manner.

BRIEF DESCRIPTION OF DRAWING

The accompanying drawing shows a cross-sectional view of an embodiment of a sanitary water fixture, constructed according to the principles of the present invention.

DETAILED DESCRIPTION OF THE INVENTION

The top cartridge represented in the sole FIGURE is provided in a conventional manner with a head piece 9 fixed to a support 11. Into the head piece 9 extends a spindle 8 to open and shut off the supply of water. The spindle has splines 18 at the top. Over the spindle is cupped a handle adapter 6 in engagement at the top with the splines of the spindle 8, and guiding the spindle 8 at the bottom with small tolerance.

Outside the handle adapter 6, a handle sleeve 2 is provided, which is integral with a handle 19, shown partially broken away. This sleeve 2 has an annular flange 20 on whose upper shoulder 14, a ring 5 of an elastic material, viz. an 0-ring or a rubber washer, rests. A clutch sleeve 4 is screwed to the handle adapter 6, and presses the ring 5 firmly against the shoulder 14. The resulting pressure acts also on the bottom shoulder 12 of the annular flange 20, forming a friction surface. After insertion of the ring 5, the clutch sleeve 4 is drawn up to a torque of 8 Newton-meters [Nm] on the top surface 13 of the adapter 6.

The friction clutch formed as described above, creates a slip torque of about 3 Nm, while the tightening torque of 8 Nm prevents the clutch sleeve 4 from coming loose when the handle 19 slips. The slip force depends on the tolerances of the press dimension for the ring 5. In the preferred embodiment, these dimensions are selected so as to provide a torque tolerance of 2 Nm. The sleeve 2 is also sealed from the head piece 9 by a seal 7. By pressing the ring 5 against the surfaces 14 and installing this seal 7, the friction surface is sealed off from above and below. This prevents any entry of dirt or soap that might alter the moment of friction.

The spindle 8 is supported at its weakest cross section 16 by the adapter 6. The lever 19 is slipped onto the adapter 6 as a one-piece component and supported on the head piece 9 by way of a suitable precision bore. A lock screw 3 keeps the lever handle 19 from coming loose and the handle 19 is prevented from slipping upward by means of a projecting rim 21. A cap 1 snap fits into a recess formed into the top of sleeve 2 so as to close off from view the lock screw 3. The lower part of the sleeve 2 embraces the head piece 9 like a bell, and in so doing rests in close contact with the outer surfaces of the head piece 9. Additionally, seal 7 is provided between these surfaces. This seal provides not only a sealing effect but also provides a purchase for the lever if wall-mounted so that it will not open of its own accord.

The possibility exists of installing the entire handle as a replaceable unit with the above-mentioned torque. For this purpose, the handle sleeve 2 with adapter 6 need only be mounted and then secured by means of the lock screw 3. The lever is then oriented, for example at 90°, simply by using the friction clutch. The slip torque may be regulated subsequently by putting in flat washers on the ring 5, for example in case of wear.

These and further modifications herein dislosed will occur to persons skilled in the art to which the present invention pertains and also such modifications are deemed to be within the scope and spirit of the present invention defined by the appended claims.

What is claimed is:

1. A lever handle assembly for a sanitary fixture, which includes a spindle for actuating said fixture, said lever handle assembly comprising:

a handle adapter for a non-rotatable connection over said spindle;

a handle sleeve having an [long] elongated handle lever, said handle sleeve having an annular flange; and a friction coupling for coupling said handle adapter to said handle sleeve, said annular flange having an upper shoulder, said friction coupling including an elastic O-ring supported on said upper shoulder of said annular flange, a clutch sleeve for pressing said O-ring against said upper shoulder, whereby said spindle can be selectively opened or closed by actuating said handle lever.

2. The lever handle assembly of claim 1, wherein said [friction coupling comprises:

a clutch sleeve, and an elastic ring, said handle sleeve having an annular flange with an upper shoulder on which said elastic ring rests, said] clutch sleeve [being] is adjustably connected to said handle adapter so as to press said elastic 0-ring against said upper shoulder.

3. The lever handle assembly of claim 2, wherein said annular flange of said handle sleeve further having a bottom shoulder, and said handle adapter further having an annular flange, said bottom shoulder and said annular flange being pressed against each other when said clutch sleeve is connected to said handle adapter so as to create a friction therebetween.

* * * * *

UNITED STATES PATENT AND TRADEMARK OFFICE
CERTIFICATE OF CORRECTION

PATENT NO. : 4,977,641
DATED : December 18, 1990
INVENTOR(S) : Rudolf Steffes

It is certified that error appears in the above-identified patent and that said Letters Patent is hereby corrected as shown below:

In column 3, line 3, after "an", delete "[long]".

In column 3, line 15, delete "[friction coupling comprises:"

In column 4, lines 1 through 5, delete
"a clutch sleeve, and
an elastic ring, said handle sleeve having an annular
   flange with an upper shoulder on which said elastic
   ring rests,
said]".

In column 4, line 5, after "sleeve", delete "[being]".

Signed and Sealed this

Eighth Day of September, 1992

*Attest:*

DOUGLAS B. COMER

*Attesting Officer*   Acting Commissioner of Patents and Trademarks